July 7, 1931.  L. E. HILDEBRAND  1,813,802
ANNEALING MAGNETIC PUNCHINGS
Filed Nov. 21, 1929
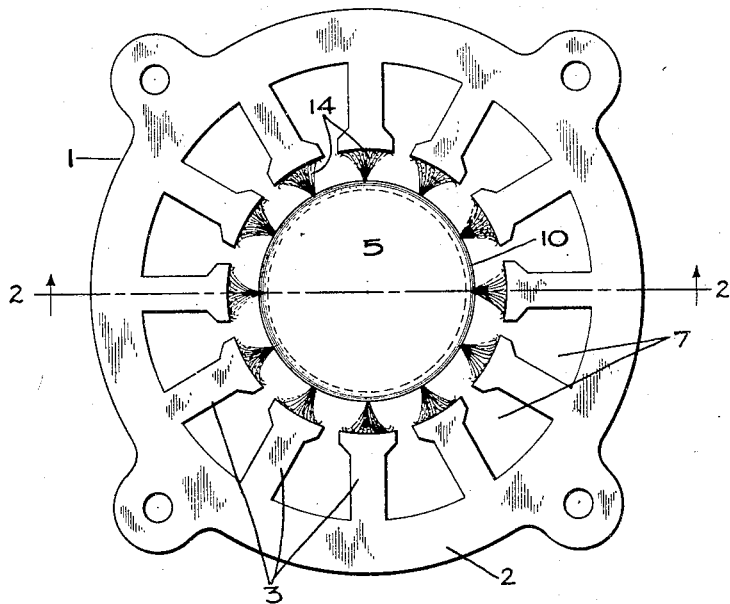
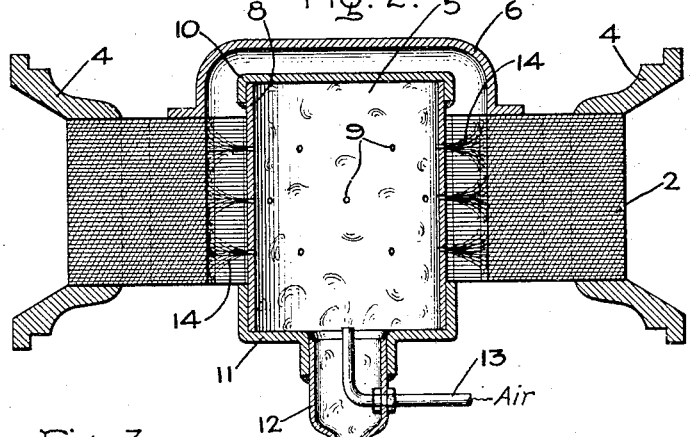
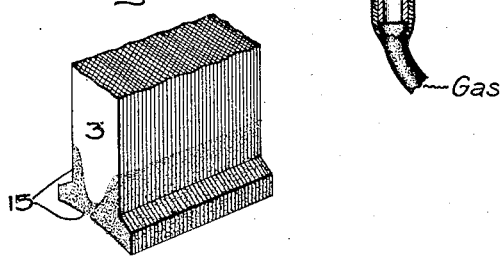
Inventor:
Lee E. Hildebrand,
by Charles E. Mullen
His Attorney.

Patented July 7, 1931

1,813,802

UNITED STATES PATENT OFFICE

LEE E. HILDEBRAND, OF MARBLEHEAD, MASSACHUSETTS, ASSIGNOR TO GENERAL ELECTRIC COMPANY, A CORPORATION OF NEW YORK

ANNEALING MAGNETIC PUNCHINGS

Application filed November 21, 1929. Serial No. 408,891.

The present invention relates to a process for annealing magnetic steel punchings and more particularly to a process for annealing the magnetic steel punchings employed in dynamo electric machines. The stator member in such machines usually consists of a yoke and projecting teeth and is ordinarily fabricated by assembling silicon sheet steel laminæ or punchings of a desired shape. Due to strains produced in the steel by the punching or shearing operation, its magnetic properties are adversely affected or caused to deteriorate adjacent to the sheared edges of the punchings. This deterioration may extend approximately 5 to 20 mills inwardly from the sheared edges and has the effect of reducing the effective area in the tooth and yoke portions of the punching. This reduction of area is obviously small and not particularly serious. However, along the sheared edges which form the air gap surface of the dynamo electric machine the magnetic flux must pass across rather than parallel to the deteriorated surface. Any deterioration of material at this surface results in increased magnetizing current and core loss and obviously substantially decreases the efficiency of the electrical machine.

The deterioration caused by the punching operation has hitherto been overcome by heating and cooling the entire punching in large lots. The former process however has several disadvantages. For example, since it takes several hours for its completion, and the entire punching as well as the protecting containers must be raised to the required temperature, about 850° C., it is wasteful in the amount of heat energy consumed, is uneconomical in time and manufacturing space and is in general inconsistent with modern manufacturing methods in that it interferes with the progress of material from and to the several required operations at the steady rate of production. Also, when annealed at a temperature of about 850° C. the laminated sheets and especially those at the bottom of the stack have a tendency to become welded together and have to be given a sharp blow to separate them.

According to the present invention, steel that has been sheet annealed at the mill is used, and only that part of the punching which has deteriorated because of punching or shearing operations and which would be responsible, if not annealed, for the inferior performance of the electric machine, is subsequently raised to the annealing temperature. The punchings may be annealed either in a loose stack or an assembled unit as desired. In either case however only the tooth tips are heated. The rate of applying heat energy to the tooth tips is purposely made high enough so that the remainder of the punching is relatively cool. The heat energy may be applied by employing a gas burner of the so-called blast type, as illustrated on the drawings.

By heating the tooth tips only the annealing process may be completed in a few minutes. Moreover, the temperature required to relieve the punching strains is materially less than that required for an original anneal, so that no trouble from sticking of the punchings is experienced with usual grades of silicon steel. While the present method does not permit the use of the paper or enamel sheet insulation usual in large machines, this is not a handicap for small machines where it is not now customary to use any insulation. Dependence in the latter case is placed on the natural surface scale of silicon steel.

The novel features which I believe to be characteristic of my invention are set forth with particularity in the appended claims. The invention itself however will best be understood from reference to the following specification when considered in connection with the accompanying drawings in which Fig. 1 is a plan view which shows diagrammatically, a typical assembly of stator punchings and a heater unit therefor with the heater cover removed; Fig. 2 is a cross section on line 2—2; while Fig. 3 is a perspective view on an enlarged scale of a portion of a stator tooth element, the shaded portions of the tooth indicating the annealed portion.

Referring more particularly to the drawings, I have indicated at 1 the stator element of a dynamo electric machine. The stator comprises a plurality of silicon sheet punchings or laminæ each having a yoke portion 2 and teeth 3. In carrying out my invention, the assembled stator punchings are evenly spaced around a central cylindrical bearing (not shown) and are confined within end frames 4 which are a part of the stator assembly. A gas burner 5 of the blast type is mounted centrally within the stator assembly and a cover 6 placed on the stator above the burner so that exhaust gases from the burner flames must first pass radially through slots 7 and then axially upward through the slots. The use of cover 6 causes a slight heating of the slot portion of the punchings although it is not employed for that purpose but rather to bring the flames into intimate contact with the tooth tips, thereby slightly increasing the efficiency of the annealing operation.

Gas burner 5 consists of a hollow cylinder 8 having a large number of small radial holes 9 and cap portions 10 and 11. Illuminating or other suitable gas is admitted to cylinder 8 through pipe 12 which is provided with an air inlet 13 to provide a suitable combustible mixture of air and gas. The mixed air and gas flows outwardly from cylinder 8 through the radial holes 9 and when ignited provides a large number of small flames 14 which heat the portion 15 (Fig. 3) of each tooth on the assembled punchings to the desired annealing temperature.

The tooth tips should be in the hottest portion of the flames and can be heated quickly to the annealing temperature. This is accomplished efficiently by the burner illustrated in Figs. 1 and 2 which provides a series of very hot flames so disposed that the tooth tips are quickly heated to the desired annealing temperature without having to supply heat energy to raise the temperature of the remainder of the punchings. Since the heat transferred to the punchings is only that in the flame immediately in contact with the punching, it is obviously more efficient to employ a large number of small very hot flames than a single large flame which would waste most of the heat energy.

While I have employed a mixture of gas and air as the heating material, other sources of heat energy and other heaters may be employed. It is mainly desirable to employ a heating element which will rapidly heat the end portions of the stator teeth without substantially heating the main portion of the punching. While the magnetic properties of the sheet steel are impaired at all the sheared edges of the punching, it is only necessary to anneal that portion of the punching which is so located as to be most detrimental to the performance of the dynamo electric machine. That portion is the air gap surface through which the magnetic flux passes.

Heretofore in the fabrication of dynamo electric machine parts from magnetic laminæ, it has been customary to take the punchings from a punch press to an annealing oven and then to cool them prior to assembly. The punchings were annealed in large lots at a relatively high temperature, i. e. about 850° C. and since the entire punchings were annealed considerable time was required to cool them to a point at which they could be safely handled and assembled. The prior process involved a considerable loss of time and was not consistent with or adapted to modern manufacturing methods.

The present process however is particularly adapted to high speed production and when employed in the fabrication of dynamo electric machine parts from magnetic laminæ, there is no interruption in the progress of the work from the punch press, which produces the punchings, to the final operation on the assembled laminæ. For example, a conveyor carries sheet steel to a punch press and punchings from the press are then carried on the conveyor to an assembly bench where they are assembled in a desired position within end frames 4, as indicated on the accompanying drawings. The assembled punchings are then carried to an annealing gas burner, interposed between the assembly bench and a bore grinding machine, and heat applied for a few minutes to the tooth tip portions of the punchings. The annealing temperature employed is probably in the neighborhood of 600° C.

After annealing, the punchings are cooled quickly by conduction of the heat energy to the cooler portions of the punchings and by dissipation in the surrounding air and may be handled safely shortly after the gas is turned off in the annealing burner. The punchings are then carried on the conveyor to the bore grinding machine where the final operation may be performed on the assembled punchings.

The gas burner employed for annealing the punchings may be interposed, as described above, between the assembly bench and a bore grinding machine although it may also be located between the punch press and the assembly bench. In the latter case, a large number of the punchings may be stacked and annealed in a suitable holder and before assembly. If desired, the annealing burner may also be located so that the annealing process may follow the bore grinding operation and thereby constitute the last step in the fabrication of the laminated punchings.

The annealing burner may be a single stationary burner although if desired a plurality of burners may be mounted circumferentially on a continuously rotating table. When the latter method is employed, an assembled stator for example may be placed around one of the burners on the rotating table and heated during about one quarter of a revolution of the table and then allowed to cool during the next half revolution, after which the stator may be unloaded and delivered to the bore grinding machine.

Of course, instead of mounting the rotating table as indicated, between the assembly bench and the bore grinding machine, it could, if desired, be mounted, as in the case of the single burner, between the punch press and the assembly bench, or, it could be located so as to follow the bore grinding operation and thus constitute the last step in the fabrication of the magnetic laminæ.

What I claim as new and desire to secure by Letters Patent of the United States is:

1. The method of fabricating a dynamo electric machine from magnetic laminæ having a yoke portion and teeth extending therefrom which comprises assembling said laminæ in superimposed relation and locally heating the end portions of said teeth which comprise the air gap surface of said dynamo electric machine to annealing temperature without substantially heating the yoke portion of said laminæ.

2. The method of fabricating a dynamo electric machine from magnetic laminæ having a yoke portion and teeth extending therefrom which comprises assembling said laminæ in superimposed relation and concentrically with a heater element, and heating to annealing temperature by means of said element the portion of said teeth which comprises the air gap surface of said dynamo electric machine without substantially heating the main portion of said laminæ.

3. The method of fabricating a dynamo electric machine from magnetic laminæ having a main portion and teeth extending therefrom which comprises assembling said laminæ in superimposed relation and concentrically with a heater element, and heating only the ends of said teeth adjacent the heater to annealing temperature.

4. The method of fabricating a dynamo electric machine from magnetic laminæ having a yoke portion and teeth extending therefrom which comprises assembling said laminæ in superimposed relation around a heating element centrally disposed within said laminæ and directing a plurality of flames from said heater element against the ends of said teeth adjacent said heater element.

5. The method of fabricating a dynamo electric machine from magnetic laminæ having a yoke portion and teeth extending therefrom which comprises assembling said laminæ in superimposed relation around a heating element centrally disposed within said laminæ and directing a plurality of flames from said heater element against the ends of each of said teeth adjacent said heater element.

6. The method of fabricating a dynamo electric machine from magnetic laminæ having a yoke portion and teeth extending therefrom which comprises assembling said laminæ in superimposed relation and concentrically with a heater element and directing a plurality of flames from said heater element against the ends of each of said teeth adjacent said heater element.

In witness whereof, I have hereunto set my hand this 19th day of November, 1929.

LEE E. HILDEBRAND.